United States Patent
Marshall et al.

(10) Patent No.: US 8,904,210 B2
(45) Date of Patent: Dec. 2, 2014

(54) VISUAL INDICATOR AND ADJUSTMENT OF MEDIA AND GAMING ATTRIBUTES BASED ON BATTERY STATISTICS

(75) Inventors: Carl S. Marshall, Portland, OR (US); Selvakumar Panneer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 316 days.

(21) Appl. No.: 13/435,090

(22) Filed: Mar. 30, 2012

(65) Prior Publication Data
US 2013/0262890 A1   Oct. 3, 2013

(51) Int. Cl.
| | |
|---|---|
| G06F 1/32 | (2006.01) |
| G06F 1/00 | (2006.01) |
| H02J 7/00 | (2006.01) |
| G08B 21/00 | (2006.01) |
| H04M 1/00 | (2006.01) |
| G01R 31/36 | (2006.01) |

(52) U.S. Cl.
CPC ............ *G06F 1/3212* (2013.01); *G06F 1/3287* (2013.01)
USPC ........... 713/320; 713/300; 320/125; 320/136; 340/636.1; 455/574; 702/63

(58) Field of Classification Search
CPC ...................................................... G06F 1/3212
USPC ........ 713/300, 320; 320/125, 136; 340/636.1; 455/574; 702/63
See application file for complete search history.

(56) References Cited

U.S. PATENT DOCUMENTS

| | | | | |
|---|---|---|---|---|
| 7,289,166 | B2 * | 10/2007 | Kimura ......................... | 348/730 |
| 8,126,517 | B2 * | 2/2012 | Ashbrook et al. ............ | 455/574 |
| 8,423,306 | B2 * | 4/2013 | Duncan et al. ................. | 702/63 |
| 8,639,232 | B2 * | 1/2014 | Rabii ............................ | 455/418 |
| 8,665,214 | B2 * | 3/2014 | Forutanpour et al. ......... | 345/158 |
| 2007/0147794 | A1 * | 6/2007 | Araki ............................ | 386/125 |
| 2010/0277326 | A1 * | 11/2010 | Berk et al. ............... | 340/636.11 |
| 2012/0317432 | A1 * | 12/2012 | Assad et al. .................. | 713/340 |
| 2013/0067255 | A1 * | 3/2013 | Nikam .......................... | 713/320 |
| 2014/0095091 | A1 * | 4/2014 | Moore et al. ................... | 702/63 |

\* cited by examiner

*Primary Examiner* — Stefan Stoynov
(74) *Attorney, Agent, or Firm* — Jordan IP Law, LLC

(57) ABSTRACT

Systems and methods may provide for identifying an amount of time associated with a user based activity with respect to a battery powered device, and determining a battery drain rate of the battery powered device. An indicator of whether the user based activity can be completed in the amount of time may be generated based on the battery drain rate.

32 Claims, 5 Drawing Sheets

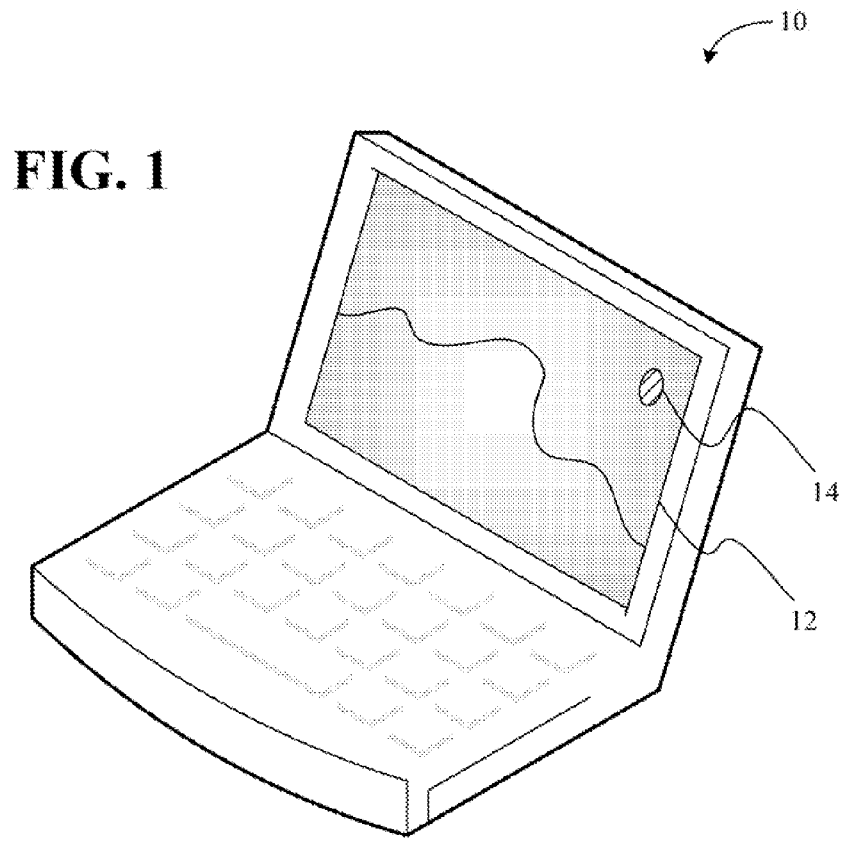
FIG. 1
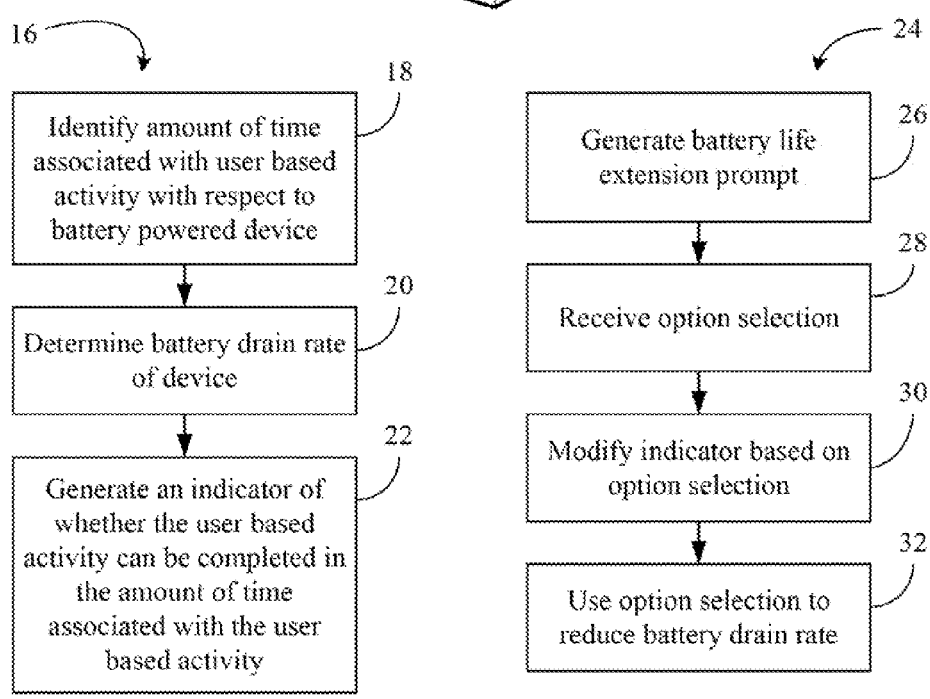
FIG. 2
FIG. 3

VISUAL INDICATOR AND ADJUSTMENT OF MEDIA AND GAMING ATTRIBUTES BASED ON BATTERY STATISTICS

BACKGROUND

Battery operated devices such as laptops, smart tablets, cell phones, etc., may display video content such as movies. Under conventional solutions, however, the user may need to speculate how much video content can be played based on a battery life indicator on the device. Such an approach may be inexact and can lead to a suboptimal user experience with regard to the device and/or video content.

BRIEF DESCRIPTION OF THE DRAWINGS

The various advantages of the embodiments of the present invention will become apparent to one skilled in the art by reading the following specification and appended claims, and by referencing the following drawings, in which:

FIG. 1 is a perspective view of an example of a battery operated device having a visual indicator of whether a user based activity can be completed in an amount of time associated with the activity according to an embodiment;

FIG. 2 is a flowchart of an example of a method of indicating whether a user based activity can be completed on a battery operated device in an amount of time associated with the activity according to an embodiment;

FIG. 3 is a flowchart of an example of a method of reducing battery drain rate in a battery operated device if a user based activity cannot be completed in an amount of time according to an embodiment;

DETAILED DESCRIPTION

Figure 4A:
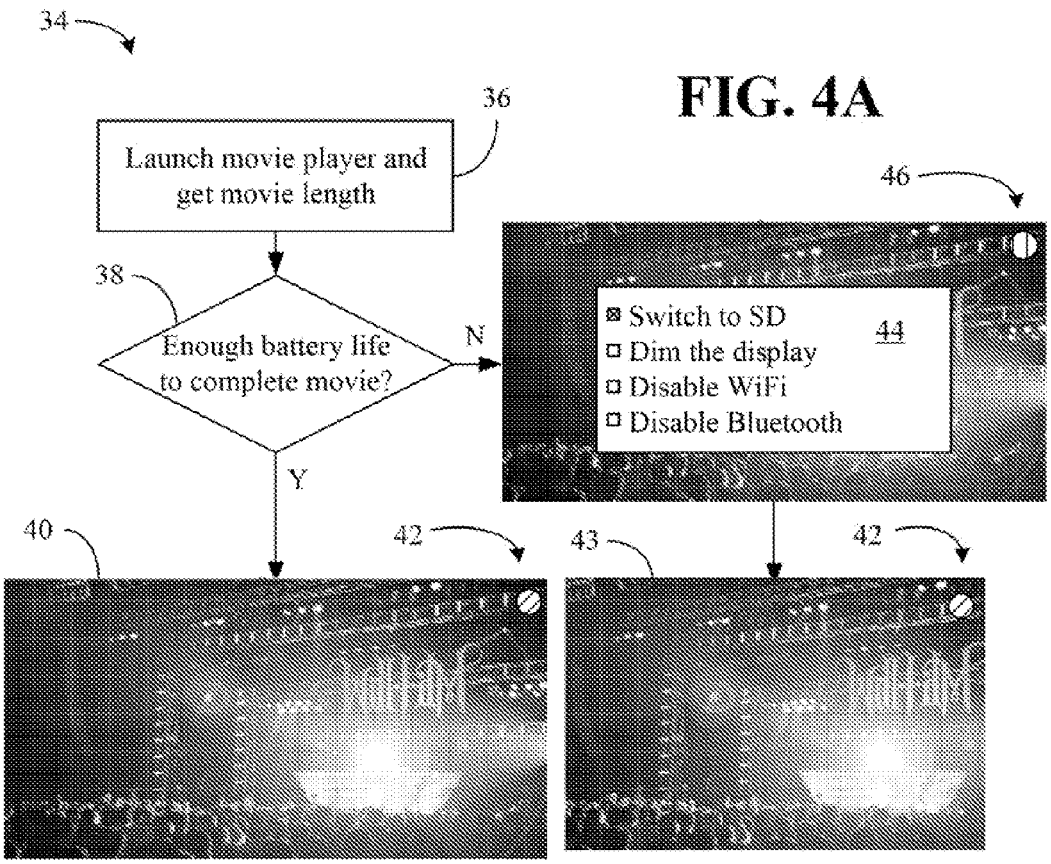
FIG. 4A is a flowchart of an example of a method of configuring a movie for playback on a battery operated device according to an embodiment.

Embodiments may include a method in which an amount of time associated with a user based activity is determined with respect to a battery powered device. The method can also provide for determining a battery drain rate of the battery powered device, and generating an indicator of whether the user based activity can be completed in the amount of time based on the battery drain rate.

Additionally, embodiments may include a computer readable storage medium having a set of instructions, which, if executed by a processor, cause a battery powered device to identify an amount of time associated with a user based activity with respect to the battery powered device. The instructions can also cause the battery powered device to determine a battery drain rate of the battery powered device, and generate an indicator of whether the user based activity can be completed in the amount of time based on the battery drain rate.

Embodiments may also include a device having a battery to supply power to the device, and logic to identify an amount of time associated with a user based activity with respect to the device. The logic can also determine a battery drain rate of the device and generate an indicator of whether the user based activity can be completed in the amount of time based on the battery drain rate. The device may also have a display to output the visual indicator.

Other embodiments may involve a computer implemented method in which an amount of time associated with a user based activity is identified with respect to a battery powered device. A battery drain rate of the battery powered device can be determined, wherein the method may provide for generating a visual indicator of whether the user based activity can be completed in the amount of time. Moreover, the method may provide for conducting a profile analysis based on one or more of an activity type associated with the user based activity, a device type associated with the battery powered device, and an operating system associated with the battery powered device. In addition, the profile analysis can be used to generate a battery life extension prompt, wherein the prompt can correspond to one or more of a network interface option, a quality option, and a display resolution option. Additionally, the method can receive an option selection, modify the visual indicator based on the option selection, and use the option selection to reduce the battery drain rate.

Turning now to FIG. 1, a battery operated device 10 is shown, wherein the device 10 may be used to conduct various user based activities such as watching movies or other video (e.g., social networking content), playing 3D (three dimensional) games, and so forth. In the illustrated example, the device 10 includes a display 12 that outputs a visual indicator 14 of whether there is enough battery life to enable the user to complete the user based activity in an amount of time associated with the activity. Thus, in the case of a movie, the amount of time might correspond to the video/movie length, wherein the visual indicator 14 can inform the user as to whether there is sufficient battery life to watch the entire movie. Such functionality may be particularly advantageous, for example, in a scenario in which the user is about to embark on a relatively long flight and would like to know if his or her device has sufficient battery life to watch a particular movie during the flight. Similarly, if the activity involves playing a video game, the amount of time could correspond to the game length, wherein the illustrated visual indicator 14 informs the user as to whether there is sufficient battery life to play the game.

In particular, the visual indicator 14 may be dependent upon the battery drain rate of the device 10 under the current device settings. As will be discussed in greater detail, the device 10 may also present the user with one or more menus/options that enable the user to modify the device settings in order to achieve a device configuration that will support completion of the user based activity. Although the illustrated device 10 is a laptop/notebook computer, the device 10 may include any type of battery operated device. For example, the device 10 may also include a personal digital assistant (PDA), wireless smart phone, media player, imaging device, mobile Internet device (MID), any smart device such as a smart phone, smart tablet and so forth, or any combination thereof.

FIG. 2 shows a method 16 of indicating whether a user based activity can be completed on a battery operated device in an amount of time associated with the activity. The method 16 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method 16 may be written in any combination of one or more programming languages, including an object oriented programming language such as C++ or the like and conventional procedural programming languages, such as the "C" programming language or similar programming languages. Moreover, the method 16 could be implemented using any of the aforementioned circuit technologies.

Illustrated processing block 18 provides for identifying an amount of time associated with a user based activity with respect to a battery powered device. The amount of time could include, for example, a video length, game length, and so forth. In the case of a video game, the game length may correspond to a user request and/or purchase of a certain amount of playing time or levels. Indeed, the amount of time could correspond to any media component that has either a fixed or a continuous time duration (e.g., movies are typically fixed and video games can be continuous). Moreover, the amount of time may be determined relative to specific user requests as well as calendar entries (e.g., particular meetings, appointments, flight durations).

A determination of the battery drain rate of the battery powered device can be made at block 20, wherein the drain rate determination could involve one or more current and/or voltage measurements, reading one or more device registers, querying one or more power delivery components, and so forth. Block 20 may also provide for determining the current charge level (e.g., Amps, Watts) of the battery as well as the minimal charge level needed to operate the device. Illustrated block 22 generates an indicator of whether the user based activity can be completed in the amount of time associated with the user based activity. The indicator may be visual, audible, tactile, etc., or any combination thereof. For example, the visual indicator may have a color component, a text component, a graphic component, etc., as appropriate. For example, if the activity cannot be completed, block 22 might provide for generating a "red light" to inform the user of the insufficient battery life. If, on the other hand, the activity can be completed, block 22 could generate a "green light" on a display of the device.

Turning now to FIG. 3, a method 24 is shown of reducing the battery drain rate of a battery operated device if a user based activity cannot be completed in an amount of time. Additionally, the user may be permitted to input the amount of time that he/she has, wherein the input can enable the user to know if, for example, a movie cannot be completed in that amount of time, or if game settings need to be adjusted in order to play for the given duration. Thus, the method 24 may be generally triggered by a determination in method 16 (FIG. 2) that the user based activity cannot be completed. The method 24 may be implemented as a set of logic instructions stored in a machine- or computer-readable storage medium such as RAM, ROM, PROM, flash memory, etc., in configurable logic such as PLAs, FPGAs, CPLDs, in fixed-functionality logic hardware using circuit technology such as ASIC, CMOS or TTL technology, or any combination thereof. Illustrated processing block 26 provides for generating a battery life extension prompt, which may include a menu of device settings/options. In one example, block 26 involves conducting a profile analysis of the device and using the profile analysis to identify the device options.

For example, the profile analysis may include identifying the type of user based activity involved (e.g., watching a movie) and identifying device options that are likely to be relevant to that type of activity from a battery life perspective. Similarly, the profile analysis could include using the type of device and/or operating system (OS) resident on the device to identify relevant device options. Thus, the device settings could include quality options such as resolution settings (e.g., standard definition/SD versus high definition/HD), brightness settings, anti-aliasing settings (e.g., multi-sample anti-aliasing/MSAA, texture filtering quality, mipmapping levels, resolution size), etc., network interface options such as Wi-Fi settings (Wireless Fidelity, e.g., Institute of Electrical and Electronics Engineers/IEEE 802.11-2007, Wireless Local Area Network/LAN Medium Access Control (MAC) and Physical Layer (PHY) Specifications), Bluetooth settings (e.g., IEEE 802.15.1-2005, Wireless Personal Area Networks), etc., display width options (e.g., full screen, partial screen), and so forth.

Illustrated block 28 provides for receiving an option selection, wherein the visual indicator may be modified based on the option selection at block 30. For example, if the option selection corresponds to a user request to switch from HD to SD (wherein SD may consume significantly less power), block 30 may determine whether the switch will enable the user based activity to be completed in the amount of time associated with the user based activity, and adjust the indicator accordingly. The adjustment may involve a visual change, playing a different sound, vibrating the device at a different strength, etc. The determination at block 30 may also take into consideration the aforementioned profile analysis. For example, it could be determined that for the type of device in question, a switch from HD to SD typically results in reduction in the battery drain rate of a certain amount. Thus, the modification can leverage knowledge of similar scenarios. The option selection may also be used to reduce the battery drain rate at block 32.

Turning now to FIG. 4A, a method 34 of configuring a movie for playback on a battery operated device is shown. Thus, the method 34 may represent one example of the method 16 (FIG. 2) combined with the method 24 (FIG. 3), wherein the user based activity is watching a movie. Illustrated block 36 provides for launching a movie player and obtaining the movie length (e.g., 120 mins). If it is determined at block 38 that there is enough battery life to complete the movie, the movie 40 is played with the current device settings (e.g., as-is) and with an indicator 42 that informs the user that he or she will be able to watch the entire movie without concern over battery life. The indicator may be an onscreen implementation such as a change to one or more desktop icons (e.g., Y/N to complete movie) or any other output (e.g., audible, tactile, etc.) that may be perceived by the user. If onscreen, it can fade after a few seconds. If, on the other hand, it is determined at block 38 that there is not enough battery life to complete the movie, a different indicator 46 can be output via the display and playback of the movie may be interrupted/overlaid with a battery life extension prompt 44 containing a menu of device options for reducing the battery drain rate. In the illustrated example, the user may switch to SD, dim the display, disable Wi-Fi, and/or disable Bluetooth.

Other settings may also be used depending upon the circumstances (e.g., based on the profile analysis). Moreover, although the battery life extension prompt 44 is shown as having a menu, other configurations may be used. For example, the prompt 44 could also be configured as a "quality slider" that masks the details of the devices settings from the user. Once the device settings enable the movie to be played in its entirety, the indicator 42 may be used to inform the user and playback of the movie 43 may be continued under the new settings. In the illustrated example, switching the movie from HD to SD has provided enough power consumption savings to watch the movie 43 without having to re-charge the battery.

Figure 4B:
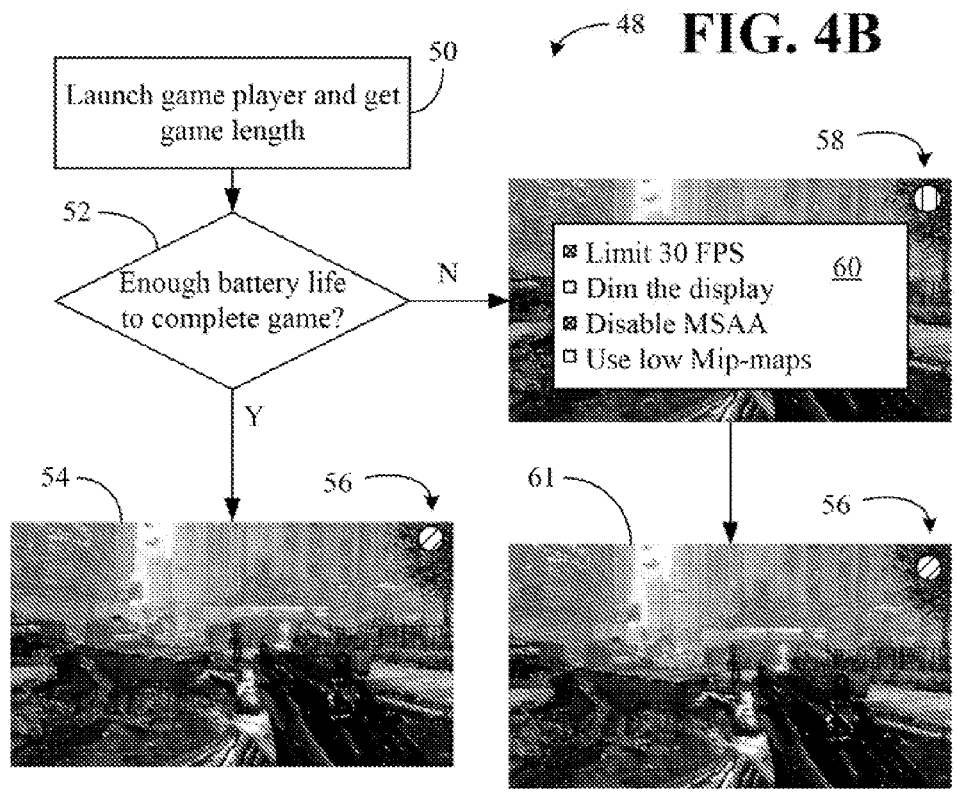
FIG. 4B is a flowchart of an example of a method of configuring a game for playing on a battery operated device according to an embodiment.

FIG. 4B shows a method 48 of configuring a game for playing on a battery operated device. Thus, the method 48 may represent one example of the method 16 (FIG. 2) combined with the method 24 (FIG. 3), wherein the user based activity is playing a video game. Illustrated block 50 provides for launching a game player and obtaining the game length (e.g., 90 mins, three levels). If it is determined at block 52 that there is enough battery life to complete the game, the game 54 is played with the current device settings and with an indicator 56 that informs the user that he or she will be able to play the entire game without concern over battery life. If, on the other hand, it is determined at block 52 that there is not enough battery life to complete the game, a different indicator 58 can be output via the display and playback of the movie may be interrupted/overlaid with a battery life extension prompt 60 containing a menu of device options for reducing the battery drain rate. In the illustrated example, the user may limit the frame rate to thirty frames per second, dim display, disable MSAA, and/or use a lower quality filter (e.g., Mipmaps). Other settings and prompt configurations may also be used depending upon the circumstances (e.g., based on the profile analysis). For example, any options that the graphics vendor allows the user to modify under advanced settings might be used to dynamically adapt the battery drain rate. Once the device settings enable the game to be completed, the indicator 56 may be used to inform the user and playing of the game 61 may be continued under the new settings.

Figure 5:
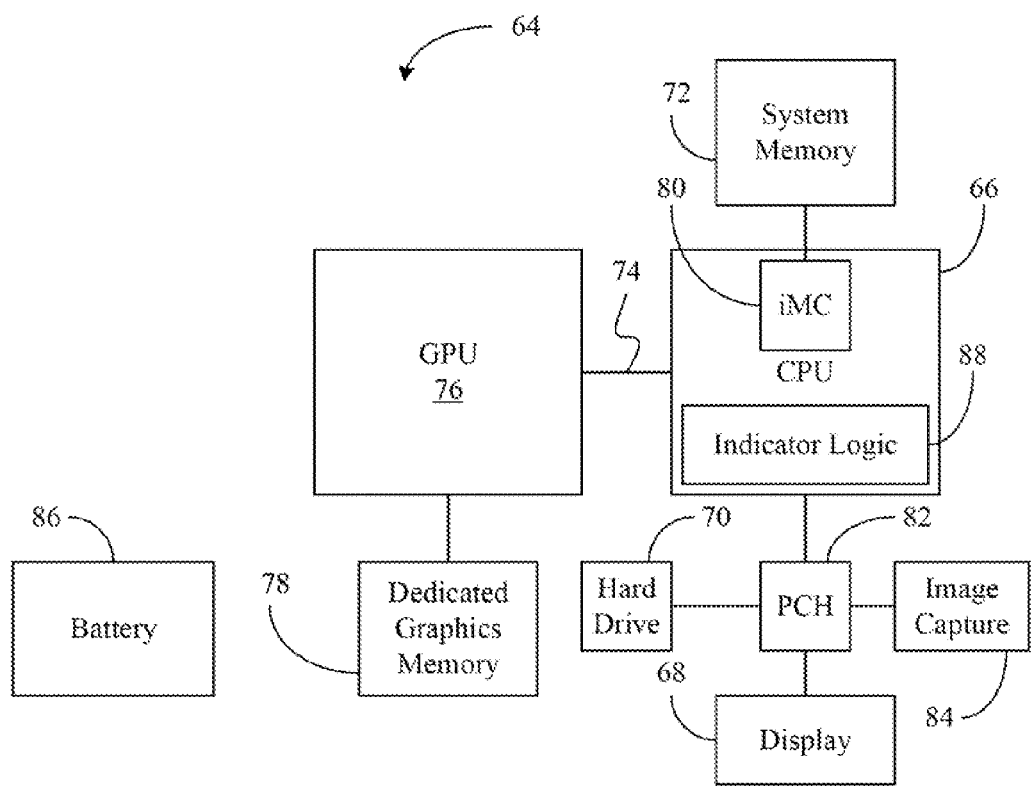
FIG. 5 is a block diagram of a system according to an embodiment.

Turning now to FIG. 5, a video-enabled computing system 64 is shown in which completion based visual indicators are implemented. The computing system 64 may be part of a mobile platform such as a laptop, PDA, wireless smart phone, media player, imaging device, MID, any smart device such as a smart phone, smart tablet and so forth, or any combination thereof. The illustrated computing system 64 includes one or more CPUs (central processing units) 66, a display device 68, a hard disk drive 70 and system memory 72, which could include, for example, double data rate (DDR) synchronous dynamic random access memory (SDRAM, e.g., DDR3 SDRAM JEDEC Standard JESD79-3C, April 2008) modules. The modules of the system memory 72 may be incorporated into a single inline memory module (SIMM), dual inline memory module (DIMM), small outline DIMM (SODIMM), and so forth.

The computing system 64 may include a graphics bus (e.g., slot) 74, wherein a graphics card (not shown) containing a graphics processing unit (GPU) 76 and dedicated graphics memory 78 could be coupled (e.g., plugged into) the graphics bus 74. For example, the graphics bus 74 could include a PCI Express Graphics (PEG, e.g., Peripheral Components Interconnect/PCI Express x16 Graphics 150W-ATX Specification 1.0, PCI Special Interest Group) bus, an Accelerated Graphics Port (e.g., AGF V3.0 Interface Specification, September 2002) bus, and so forth. The CPUs 66 may have an integrated memory controller (iMC) 80, and one or more processor cores (not shown) to execute one or more drivers associated with a host OS (operating system) and/or application software, wherein each core may be fully functional with instruction fetch units, instruction decoders, level one (L1) cache, execution units, and so forth. The CPUs 66 could alternatively communicate with an off-chip variation of the iMC 80, also known as a Northbridge, via a front side bus. The illustrated CPUs 66 communicate with a platform controller hub (PCH) 82, also known as a Southbridge, via a hub bus. The iMC 80/CPUs 66 and the PCH 82 are sometimes referred to as a chipset.

The illustrated computing system 64 also includes an image capture module 84, which may be used to obtain video content for visual output via the display device 68. The image capture module 84 could include, for example, a camera, camcorder, etc. The video content may also be obtained from the hard drive 70, the system memory 72, software (e.g., media player, game player) running on the CPUs 66 and/or GPU 76, or from an off-platform device (e.g., web server, remote image capture device, etc.) via a network controller (not shown). Display of the video content may involve processing that can lead to relatively high power consumption on the computing system 64. The illustrated computing system 64 is powered by a battery 86, wherein the CPUs 66 are configured to execute logic 88 that identifies an amount of time associated with a user based activity with respect to the system 64, determines the drain rate of the battery 86, and generates an indicator of whether the user based activity can be completed in the amount of time based on the battery drain rate, as already discussed. The indicator may be presented to the user via the display device 68 or other suitable device such as audio speakers (not shown), tactile output device (not shown), and so forth.

Figure 6:
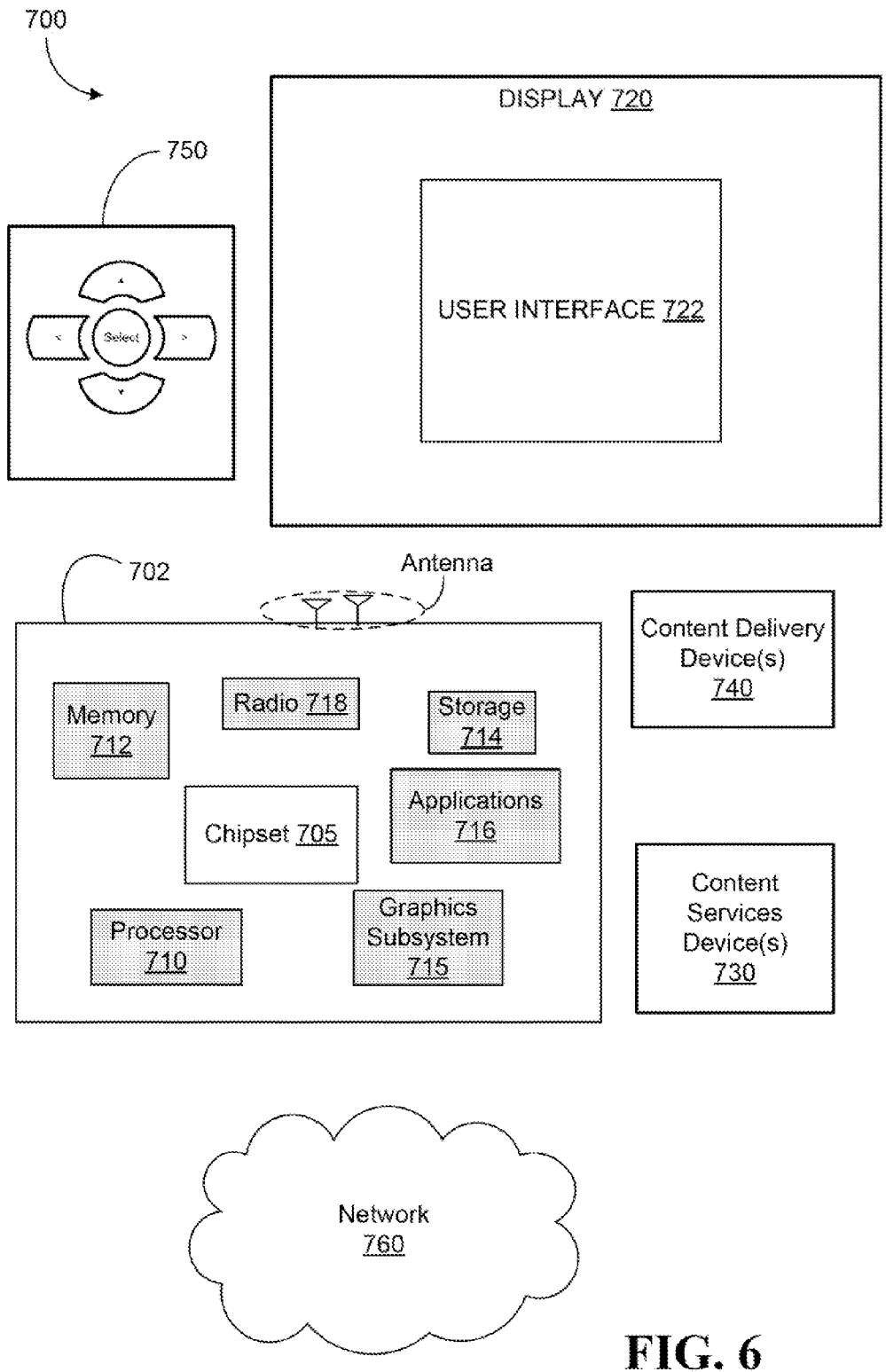
FIG. 6 is a block diagram of an example of a system having a navigation controller according to an embodiment.

FIG. 6 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services, device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
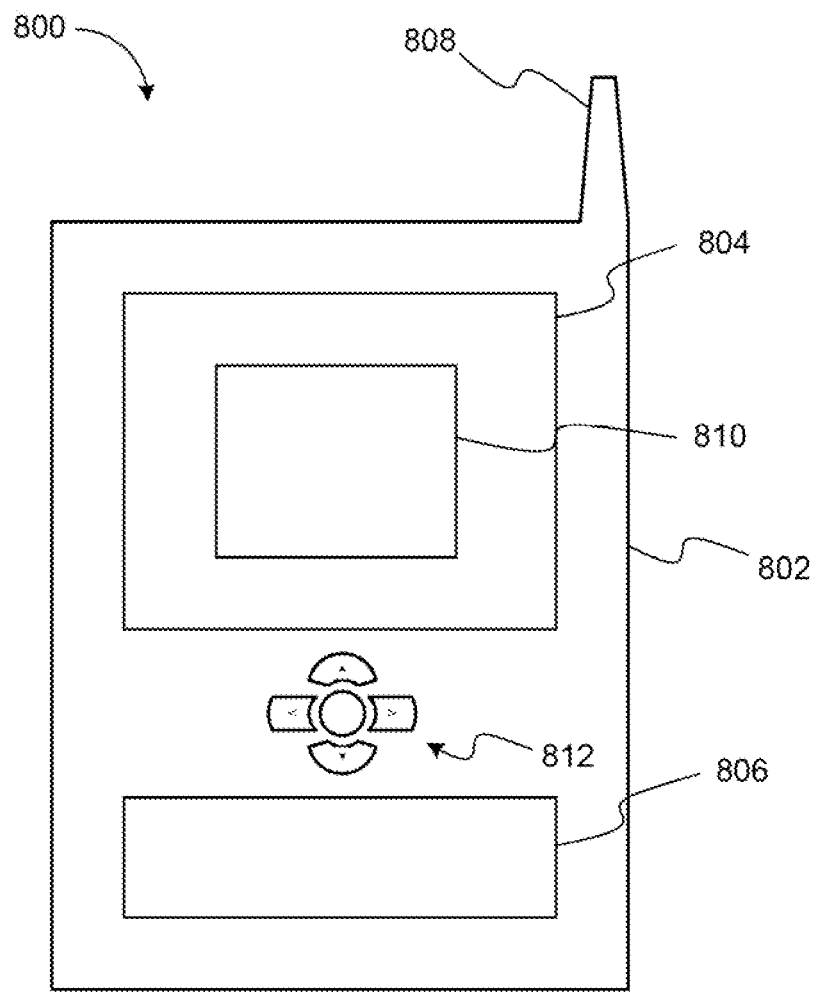
FIG. 7 is a block diagram of an example of a system having a small form factor according to an embodiment.

As described above, system 700 may be embodied in varying physical styles or form factors. FIG. 7 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Techniques described herein may therefore provide a feed-forward system that ensures both real-time operation of the consumer video pipeline and dynamic updating of the operating pipeline to deliver optimal visual perceptual quality and viewing experience. In particular, a discrete control system for the video pipeline can dynamically adapt operating points in order to optimize a global configuration of interactive component modules that are related to video perceptual quality. In a series configuration, the perceptual quality analysis module may be placed before the video processing pipeline and parameters determined for the post-processing pipeline may be used for the same frame. In the case of distributed computation of the quality analysis block or when perceptual quality analysis needs to be performed at intermediate points in the pipeline, the parameters determined using a given frame may be applied on the next frame to ensure real-time operation. Distributed computation is sometimes beneficial in reducing complexity as certain elements for perceptual quality computation may already be computed in the post-processing pipeline and can be re-used. Illustrated approaches may also be compatible with closed-loop control where the perceptual quality analysis is re-used at the output of the video processing pipeline to estimate output quality, which is also used by the control mechanism.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
   identifying an amount of time associated with a user based activity with respect to a battery powered device;
   determining a battery drain rate of the battery powered device;
   using the battery drain rate to determine whether the user based activity can be completed in the amount of time associated with the user based activity;
   generating a visual indicator of whether the user based activity can be completed in the amount of time;
   conducting a profile analysis based on an operating system type associated with the battery powered device, wherein the profile analysis is not bound to a time of day;
   using the profile analysis to generate a battery life extension prompt, wherein the prompt corresponds to one or more of a network interface option, a quality option, and a display resolution option;
   receiving an option selection;
   modifying the visual indicator based on the option selection and the profile analysis; and
   using the option selection to reduce the battery drain rate.

2. The method of claim 1, wherein the visual indicator includes one or more of a color component, a text component, and a graphic component.

3. The method of claim 1, wherein the amount of time corresponds to one or more of a video length and a game length.

4. The method of claim 1, wherein identifying the amount of time includes determining the amount of time relative to one or more of a user request and a calendar entry.

5. The method of claim 1, wherein the profile analysis is additionally based on an activity type associated with the user based activity and/or a device type associated with the battery powered device.

6. A non-transitory computer readable storage medium comprising a set of instructions which, if executed by a processor, cause a battery powered device to:
- identify an amount of time associated with a user based activity with respect to the battery powered device;
- determine a battery drain rate of the battery powered device;
- conduct a profile analysis based on an operating system type associated with the battery powered device, wherein the profile analysis is not bound to time of day; and
- generate an indicator of whether the user based activity can be completed in the amount of time based on the battery drain rate and the profile analysis.

7. The medium of claim 6, wherein the instructions, if executed, cause the battery powered device to:
- generate a battery life extension prompt if the user based activity cannot be completed in the amount of time;
- receive an option selection; and
- modify the indicator based on the option selection.

8. The medium of claim 7, wherein the instructions, if executed, cause the battery powered device to use the option selection to reduce the battery drain rate.

9. The medium of claim 7, wherein the prompt is to correspond to one or more of a network interface option, a quality option, and a display resolution option.

10. The medium of claim 7, wherein the instructions, if executed, cause the profile analysis to be used to generate the prompt and modify the indicator.

11. The medium of claim 6, wherein the indicator is to include one or more of a color component, a text component, and a graphic component.

12. The medium of claim 6, wherein the amount of time is to correspond to one or more of a video length and a game length.

13. The medium of claim 6, wherein the instructions, if executed, cause the battery powered device to determine the amount of time relative to one or more of a user request and a calendar entry.

14. The medium of claim 6, wherein the instructions, if executed, cause the battery powered device to:
- conduct a profile analysis based on an activity type associated with the user based activity and/or a device type associated with the battery powered device.

15. A device comprising:
- a battery to supply power to the device;
- logic to,
  - identify an amount of time associated with a user based activity with respect to the device,
  - determine a battery drain rate of the device, and
  - conduct a profile analysis based on an operating system type associated with the battery powered device, wherein the profile analysis is not bound to time of day; and
  - generate an indicator of whether the user based activity can be completed in the amount of time based on the battery drain rate and profile analysis; and
- a display to output the indicator.

16. The device of claim 15, wherein the logic is to,
- generate a battery life extension prompt, wherein the display is to output the prompt,
- receive an option selection, and
- modify the indicator based on the option selection.

17. The device of claim 16, wherein the logic is to use the option selection to reduce the battery drain rate.

18. The device of claim 16, wherein the prompt is to correspond to one or more of a network option, a quality option, and a display resolution option.

19. The device of claim 16, wherein the profile analysis is to be used to generate the prompt and modify the indicator.

20. The device of claim 15, wherein the indicator is to include one or more of a color component, a text component, and a graphic component.

21. The device of claim 15, wherein the amount of time is to correspond to one or more of a video length and a game length.

22. The device of claim 15, wherein the logic is to determine the amount of time relative to one or more of a user request and a calendar entry.

23. The device of claim 15, further comprising logic to conduct a profile analysis based on an activity type associated with the user based activity and/or a device type associated with the battery powered device.

24. A method comprising:
- identifying an amount of time associated with a user based activity with respect to a battery powered device;
- determining a battery drain rate of the battery powered device;
- conducting a profile analysis based on an operating system type associated with the battery powered device, wherein the profile analysis is not bound to time of day; and
- generating an indicator of whether the user based activity can be completed in the amount of time based on the battery drain rate and the profile analysis.

25. The method of claim 24, further including:
- generating a battery life extension prompt;
- receiving an option selection; and
- modifying the indicator based on the option selection.

26. The method of claim 25, further including using the option selection to reduce the battery drain rate.

27. The method of claim 25, wherein the prompt corresponds to one or more of a network interface option, a quality option, and a display resolution option.

28. The method of claim 25, wherein the profile analysis is used to generate a menu of device settings and modify the indicator.

29. The method of claim 24, wherein the indicator includes one or more of a color component, a text component, and a graphic component.

30. The method of claim 24, wherein the amount of time corresponds to one or more of a video length and a game length.

31. The method of claim 24, wherein identifying the amount of time includes determining the amount of time relative to one or more of a user request and a calendar entry.

32. The method of claim 24, wherein the profile analysis is additionally based on an activity type associated with the user based activity and/or a device type associated with the battery powered device.

* * * * *